Patented July 27, 1926.

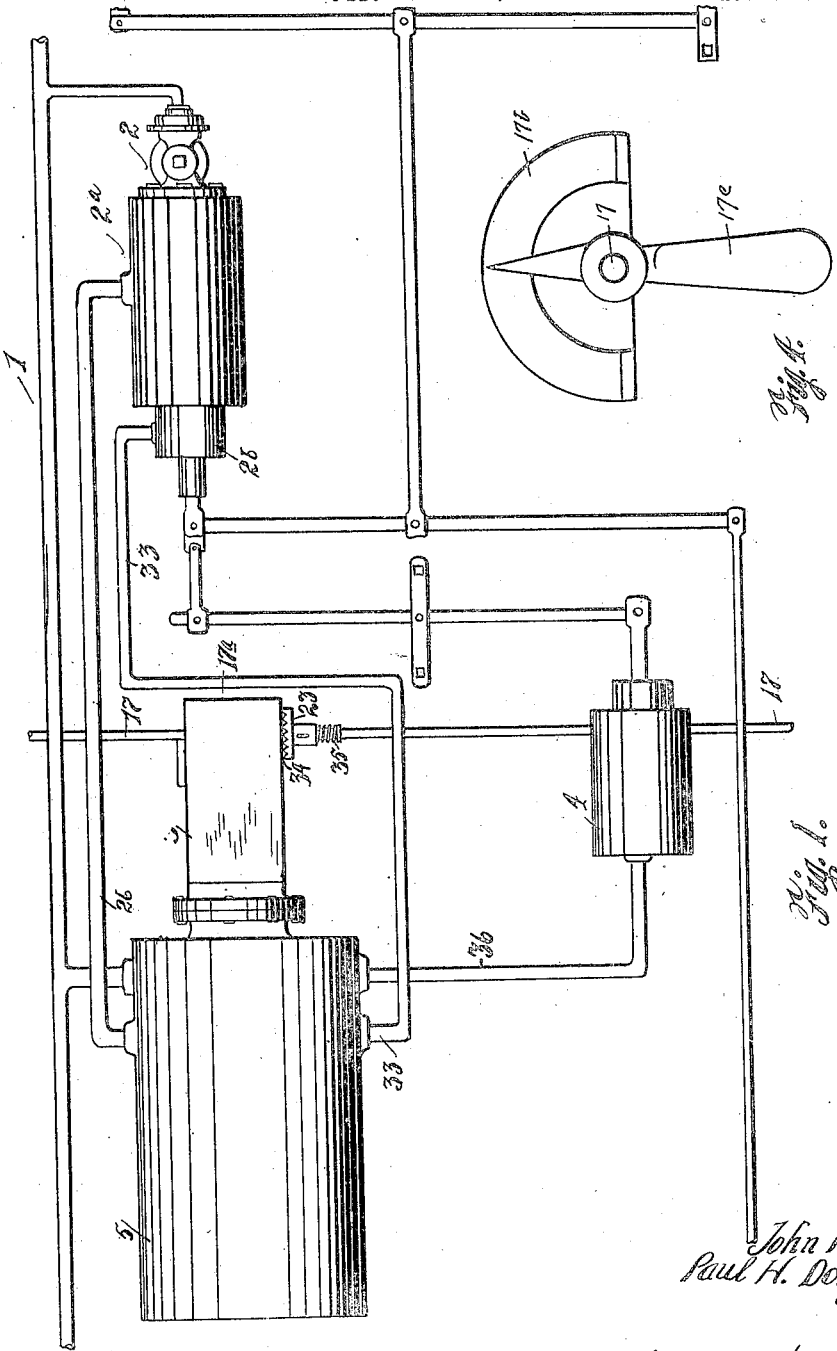

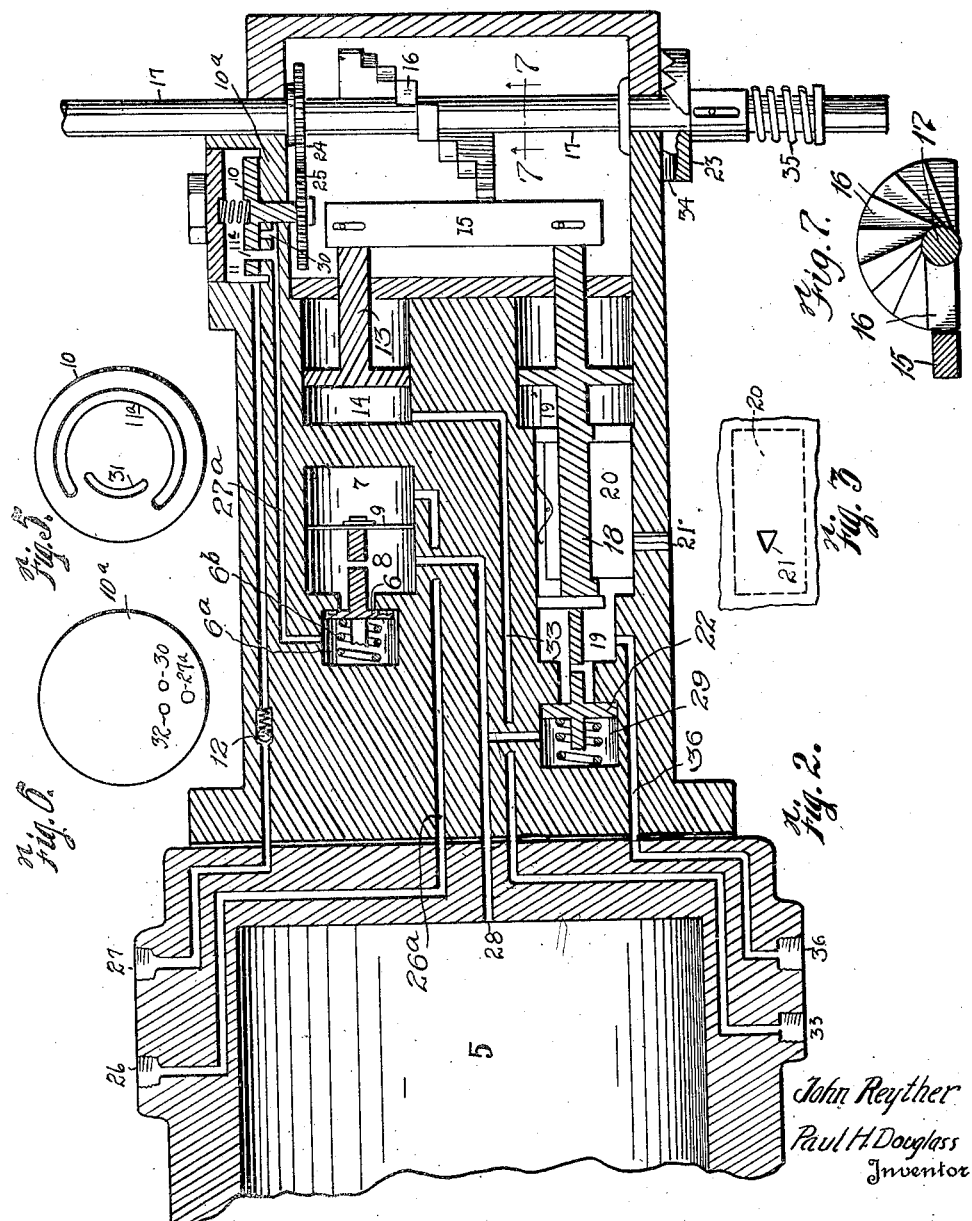

1,593,673

UNITED STATES PATENT OFFICE.

JOHN REYTHER AND PAUL HURST DOUGLASS, OF ENNIS, TEXAS.

GRADUATED-LOAD AIR-BRAKE MECHANISM.

Application filed January 19, 1925. Serial No. 3,292.

This invention relates to air brake equipment and refers more particularly to the employment of additional equipment in combination with the standard air brake parts already installed on railroad cars.

The principal object of the invention to be effected by this combination is to provide more efficient train and brake control, the combined mechanism co-operating to give a graduated braking power suitable to both empty and loaded cars.

Another particular object of the invention is that the added braking power may be made inoperative when not required.

The invention also aims to provide an assembly of parts compactly and economically arranged, eliminating too numerous pipe connections, the parts being arranged so as to facilitate repairs thereto.

With these and other important features in view, the invention will be more fully understood by perusal of the following description, in connection with the accompanying drawings, forming part hereof and in which:

Figure 1 is a plan view of the braking equipment of a railroad car and showing the addition and connection of the parts embodying the invention.

Figure 2 represents a longitudinal sectional view of the main embodiment of the additional mechanism, showing control valves, passageways and relative positions of said valves.

Figure 3 is a side elevational view of the slide valve seat.

Figure 4 is a view of a regulating quadrant.

Figure 5 is a plan view of a disc valve seat.

Figure 6 is a plan view of a disc valve.

Figure 7 is a sectional view taken substantially on the line 7—7 of Figure 2.

In carrying out the invention, attention is directed to the drawings, wherein 1 denotes a brake pipe, 2 the ordinary triple valve, 2$^a$ the standard auxiliary reservoir, 2$^b$ the standard brake cylinder. These parts comprise the standard equipment already installed on a railroad car.

The additional equipment comprises a series of control valves encased in a single housing 3, Figure 1, which operate to control the admission of fluid pressure into and exhaust from the load cylinder 4 and to charge the additional storage reservoir 5 when in load positions, also to exclude pressure from storage reservoir 5 when in empty position. A quadrant 17$^b$ with a handle 17$^c$ is placed on each side of a car by means of which the equipment may be manually changed to various positions.

The charging portion consists of a feed valve 6 in chamber 6$^a$, also a two-compartment chamber 7 and 8 which is divided by a flexible diaphragm 9, a disc valve 10 in a chamber 11 and a check valve 12. Feed valve 6 controls the flow of air into the storage reservoir 5. Diaphragm 9 controls valve 6. Disc valve 10 is a cut-off valve to shut off brake pipe pressure and exhaust of air from storage reservoir 5, when equipment is set for empty and to allow brake pipe air to flow when equipment is set for load. Check valve 12 prevents the flow of air back into brake pipe 1 when brake pipe pressure is below that in storage reservoir 5.

The means for applying and operating the added mechanism comprises a piston 13 in chamber 14, a rocker arm 15, a series of fulcrums 16 arranged spirally on a shaft 17$^a$, a piston 18 in a chamber 19, an exhaust slide valve 20, an exhaust port 21 and an application valve 22. The piston 13, controlled by pressure from standard cylinder 2$^b$ operates rocker arm 15 to the right against fulcrum 16 and pushes piston 18 to the left to control slide valve 20, exhaust port 21 and application valve 22. These fulcrums comprise a plurality of radially extending fingers of uniform length arranged in fan-like formation to engage the rocker arm 15 at different longitudinally spaced points to vary the leverage, as is quite obvious. Slide valve 20 controls the opening and closing of exhaust port 21. The application valve 22 controls the flow of air from storage reservoir 5 to the load cylinder 4. The manual control portion consists of a quadrant 17$^b$ with handle 17$^c$, one on each side of the car, flexibly attached to a shaft 17, a locking mechanism 23 attached to shaft 17, a series of fulcrums 16—16, spirally arranged on shaft 17 and a spur gear 24 attached to shaft 17. The quadrant 17$^b$ is the operating medium whereby the fulcrums 16 are set at different positions along the edge of the rocker arm 16. The locking mechanism 23 maintains the fulcrums 16 at each position attained. The fulcrums 16 being spirally arranged on shaft 17, operate to change the ratio of leverage on rocker arm 15. Spur gear 24 which is attached to shaft 17 is in mesh with gear 25 and the latter gear is attached to stem of disc valve 10.

When the equipment is set for load, the operation for charging is as follows: the air passes through the brake pipe 1 shown in Figure 1 and into the standard triple valve 3, charging the standard auxiliary $2^a$ in the usual manner. At the same time, air from the brake pipe 1 flows into the passage 27 and raises the check valve 12 and then passes into chamber 11 through the port $11^a$ in the disc valve 10, thence through passage $27^a$, into feed valve chamber $6^a$. From the standard auxiliary $2^a$ the pressure passes through the pipe 26 into the passage $26^a$, extending through the walls of the storage reservoir 5, illustrated in cross-section in Figure 2, thence through passageway $26^a$ into the chamber 7. The pressure in this chamber expands the diaphragm 9 and thereby opens the valve 6, allowing brake pipe air to flow through feed valve 6 into chamber 8 and through passage 28 into storage reservoir 5. This pressure also rests in chamber 29. Brake pipe air will continue to flow until pressure in the chamber 8 and storage reservoir 5 equal the pressure in the chamber 7, at which time spring $6^b$ operates to close valve 6. In this manner storage reservoir 5 is charged at the identical pressure and at the same time as the standard auxiliary $2^a$ is charged. It is evident that any rise in pressure in the standard auxiliary $2^a$ will operate to furnish identical pressure at the same time in storage reservoir 5, thus accomplishing uniformity in charging.

When the equipment is set on empty position, disc valve 10 closes port $27^a$ and registers port 30 shown in Figure 6 with a cavity 31 illustrated in Figure 5, and port 32, Figure 5. Cavity 31 is a depression cut half way through the disk valve 10. The port 32 communicates through the casting to the atmosphere. It will thus be seen that when the equipment is set for empty position, no air can pass from the brake pipe 1 into the storage reservoir 5, and the pressure in this reservoir 5 will be exhausted through the passage 28, chamber 8 and the valve 6, passage $27^a$, port 30, cavity 31 and port 32 to the atmosphere.

The load cylinder 4, shown in Figure 1, connected with the standard brake of a car receives pressure in this manner: when the brakes are applied through the standard triple valve 2, air pressure is passed into standard cylinder $2^b$; the pressure then passes through the pipe 33, as shown in Figure 2, the port, Figure 2, into chamber 14, actuating piston 13 which applies pressure against rocker arm 15, which in turn acts against the stepped periphery of the spiral fulcrum 16 disposed upon the shaft 17.

Proper proportioning of pressure is brought about by the actuation of the shaft 16, each of the chambers 14 and 19 being of the same diameter, the pressure required in chamber 19 to equalize that in chamber 14, will be in direct proportion as the fulcrum 16 is applied against the rocker arm 15. It is therefore obvious that when the fulcrum 16 is directly over piston 13, it renders piston 18 inoperative. This is for the purpose of eliminating the pressure for empty equipment. At such time, additional pressure is not required.

The particular advantage of this arrangement is evident in that varying loads are accommodated with proportionate braking power by the manipulation of the shaft 17. Each position is controlled by a notched collar 23, conforming with similar notches in collar 34 and held in such relation by a suitable spring 35. As pressure is applied to the piston 18, the same actuates toward valve 22, carrying slide valve 20 forward, over exhaust port 21, closing same and opening valve 22, allowing pressure to flow from storage reservoir 5, through passage 28 and chamber 29 into chamber 19, thence out through passage 36 into load cylinder 4 illustrated in Figure 2. At the time such pressure as has accumulated in chamber 19 is sufficient to equalize a proportional pressure in chamber 14, in accordance with the positions taken by the fulcrum 16 upon the rocker arm 15, the piston 18 moves to close valve 22 with the assistance of spring $22^a$ and slide valve 20 assumes service lap position, retaining pressure in the load cylinder 4. When the standard triple valve 2 assumes release position, pressure in standard cylinder $2^b$ is diminished, thereby diminishing the pressure in chamber 14 and allows the overbalancing pressure in chamber 19 to actuate piston 18 which in turn moves the rocker arm 15 and slide valve 20 to open port 21 allowing the pressure from load cylinder 4 to exhaust through port 21 at the same proportional rate as pressure is exhausted from standard cylinder $2^b$. The exhaust port opening 21, as shown in Figure 3, being an elongated triangle, operates to allow air to exhaust at the same proportional rate as pressure is diminished in chamber 14.

It should be understood that the invention is not restricted to the particular arrangement of the valves, passages, etc., but that modifications may be made coming within the principle and meaning of the following claims.

We claim:

1. A fluid pressure brake mechanism for railroad cars, in combination with the regular brake pipe, auxiliary reservoir, valve, and brake cylinder, comprising a series of control valves, a residuary storage reservoir having active communication with respective units comprising said control valves;

means to effect simultaneous charging of said mechanism, means for automatically rendering the added mechanism inoperative to conform to the weight of an empty car, said means comprising a rocker arm arranged to control the actuation of the control valve units including a lateral shaft and spiral fulcrum, said shaft adapted to be rotated to vary the position of the fulcrum and lock the shaft.

2. A fluid pressure brake mechanism for railroad cars in combination with the usual brake pipe, auxiliary reservoir, triple valve, and brake cylinder, said mechanism comprising a storage reservoir, a load cylinder, a control valve assembly for the storage reservoir; means for charging said load cylinder with pressure from said storage reservoir, means for retaining accumulated pressure in the load cylinder, and means for visibly regulating pressure entering the load cylinder by hand from the sides of a car to conform with the weight of said car.

3. A fluid pressure brake mechanism for railroad cars in combination with the regular train brake pipe, auxiliary reservoir, triple valve, and brake cylinder; said mechanism comprising a cylinder for applying power for loads, a storage reservoir, a plurality of control valves for the storage reservoir, means for simultaneously charging said storage reservoir with equal pressure to that maintained in said auxiliary reservoir; means for automatically shutting off pressure to said storage reservoir from the pipe; and means for regulating the pressure in said load cylinder in conformity with the weight of the car.

4. The combination with a brake mechanism for effecting an application of brakes and including an auxiliary reservoir and a brake cylinder; of an additional reservoir, pipe line connection between the reservoirs and between the usual train pipe and the reservoirs, means controlled by pressure in the auxiliary reservoir for maintaining uniform pressure in both reservoirs, a load cylinder adapted at times to coact with said brake cylinder, and means for admitting air to the load cylinder from the additional reservoir and simultaneously actuating the brake cylinder mechanism.

5. In a light and load brake apparatus, the combination with a brake mechanism for effecting an application of the brakes; of an additional pressure reservoir, a load cylinder adapted at times to coact with the main brake mechanism, an air conduit connecting the additional pressure reservoir and said load cylinder, valve mechanism for admitting air to said pressure reservoir, additional valve mechanism permitting passage of air to the load cylinder from said pressure reservoir, and a common manual control for varying the pressure entering the load cylinder and eliminating the pressure reservoir and load cylinder from the braking system.

6. The combination with a brake mechanism for effecting an application of brakes and including an auxiliary reservoir and brake cylinder, of an additional pressure reservoir, means controlled by pressure in the auxiliary reservoir for maintaining a uniform air pressure in the two reservoirs, a load cylinder adapted at times to coact with the brake cylinder and having pipe line connection with the additional pressure reservoir, and a common control means for regulating the pressure entering the load cylinder and for eliminating the load cylinder and pressure reservoir from the braking system.

7. In an air brake apparatus of the character set forth, a pressure actuated piston, a rocker arm pivotally interconnecting the pistons, and manually controlled means for changing the fulcrum point of the rocker arm to vary the pressure created by the second named piston.

8. A structure as specified in claim 7, said means comprising a shaft arranged in parallel relation with the rocker arm, and a set of radial fingers spirally arranged upon the shaft and adapted to abut the rocker arm at longitudinally spaced points.

In testimony whereof we have signed our names to this specification.

JOHN REYTHER.
PAUL HURST DOUGLASS.